United States Patent
Kato et al.

(10) Patent No.: US 7,462,081 B2
(45) Date of Patent: Dec. 9, 2008

(54) CONNECTION TERMINAL AND STATOR HAVING DISTRIBUTOR UNIT UTILIZING SAME

(75) Inventors: Hajime Kato, Shizuoka (JP); Hidehiko Kuboshima, Shizuoka (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 11/703,086

(22) Filed: Feb. 7, 2007

(65) Prior Publication Data
US 2007/0197106 A1 Aug. 23, 2007

(30) Foreign Application Priority Data
Feb. 23, 2006 (JP) ............... 2006-046264

(51) Int. Cl.
*H01R 4/10* (2006.01)
(52) U.S. Cl. .............. 439/877; 439/878; 439/880; 174/84 C
(58) Field of Classification Search ........... 439/877, 439/878, 880; 174/84 C
See application file for complete search history.

(56) References Cited

U.S. PATENT DOCUMENTS

| | | | | | |
|---|---|---|---|---|---|
| 2,747,171 | A | * | 5/1956 | Martines ............... | 439/877 |
| 3,826,861 | A | * | 7/1974 | Karl et al. ............. | 174/84 C |
| 4,074,065 | A | * | 2/1978 | Leaf et al. ............. | 174/87 |
| 4,464,541 | A | * | 8/1984 | Ceresa et al. .......... | 174/84 C |
| 4,950,838 | A | * | 8/1990 | Gordon ................. | 174/94 R |
| 5,532,433 | A | * | 7/1996 | Endo et al. ............ | 174/84 C |
| 7,066,774 | B2 | * | 6/2006 | Fargo et al. ........... | 439/877 |

FOREIGN PATENT DOCUMENTS

JP 2005-160137 6/2005

\* cited by examiner

*Primary Examiner*—Tho D Ta
(74) *Attorney, Agent, or Firm*—Kratz, Quintos & Hanson, LLP

(57) ABSTRACT

The present invention provides a connection terminal for holding a plurality of electrical wires ends in place prior to crimping the connection terminal without displacement of the wires ends, and a stator utilizing the connection terminal. The stator includes a distributor unit for supplying electric current to a coil unit through the electrical wires. The distributor unit has the connection terminal to be connected with the wires ends. The connection terminal has a bottom wall with a setting surface of a flat surface prior to crimping the connection terminal. The stator has a guide surface disposed on a brim of a bobbin adjacent to a holder for holding the electrical wires. The guide surface is flush with the flat surface of the connection terminal.

6 Claims, 7 Drawing Sheets

CONNECTION TERMINAL AND STATOR HAVING DISTRIBUTOR UNIT UTILIZING SAME

BACKGROUND OF THE INVENTION

1. Field of the Invention

The present invention relates to a connection terminal for connecting an electrical wire and a stator having a distributor unit utilizing the connection terminal.

2. Description of the Related Art

An electric motor is generally driven by electric power and includes a rotor to be attached to a rotation axle and a stator encircling the rotor. The stator includes a plurality of coil units circularly disposed around the rotation axle, each coil unit having a core wound with a plurality of electrical wires, a distributor unit for supplying the electric power to the electrical wires, and an insulated holder formed around the rotor for receiving the respective distributor units. When the coil units are powered with the distributor units, the coil units generate magnetic fields to rotate the rotor (refer to JP2005-160137 A).

The distributor units are formed by pressing and bending a conductive metal plate.

Each distributor unit includes a strip-shaped distributor element received in the holder and connection terminals disposed at both ends of the distributor element for connecting with the electrical wires ends.

FIG. 9A is a sectional view prior to crimping electrical wires with a conventional connection terminal 100 and FIG. 9B is a sectional view after crimping.

As shown in FIG. 9A, the connection terminal 100 has a U-shaped section, and includes a bottom wall 102 and a pair of crimping pieces 103 upstanding from both sides of the bottom wall 102. The plurality of the electrical wires 109 (two wires in FIG. 9A) are positioned at the bottom wall 102 of the connection terminal 100 and crimped with the pair of the crimping pieces 103 and electrically connected with the connection terminal 100 as shown in FIG. 9B.

As shown in FIG. 9A, the conventional connection terminal 100 has the U-shape defined by the bottom wall 102 and the crimping pieces 103. The electrical wires 109 can move on an setting surface of the connection terminal 100. When the crimping pieces 103 crimp the electrical wires 109 which are displaced to one of the crimping pieces 103 as shown in FIG. 9A, the electrical wires 109 are crimped at the one side of the crimping pieces 103 as shown in FIG. 9B.

An incorrect position of the electrical wires 109 causes an unstable electrical connection. A close contact among the electrical wires 109 causes resistance increase and abnormal heat.

SUMMARY OF THE INVENTION

An object of the present invention is to provide a connection terminal for positioning a plurality of electrical wires therein without displacement to one crimping piece prior to crimping and after crimped, and is to provide a stator including a distributor unit having the connection terminal.

According to a first aspect of the present invention, a connection terminal includes a bottom wall for holding a plurality of electrical wires; and a pair of crimping pieces upstanding from both edges of the bottom wall for crimping the plurality of the electrical wires, wherein the bottom wall has an setting surface for stably holding the plurality of the electrical wires prior to crimping.

Preferably, the setting surface has a flat surface satisfying a relation of $W \geq (N-1)2R$, where W is a width of the flat surface, N is a number of the electrical wires, and R is a radius of the electrical wires.

Preferably, the setting surface has a projection extending upwardly therefrom for positioning the electrical wires.

According to a second aspect of the present invention, a stator includes a coil unit circularly disposed around a rotation axle of a motor; and a distributor unit for connecting the plurality of the electrical wires to supply electric current thereto of the coil unit, wherein the distributor unit includes the connection terminal, and the coil unit has a bobbin having a guide surface flush with the flat surface of the connection terminal for positioning the electrical wires.

Preferably, the guide surface is disposed on the bobbin of the coil unit wound with the electrical wires.

DETAILED DESCRIPTION OF THE PREFERRED EMBODIMENTS

Figure 1:
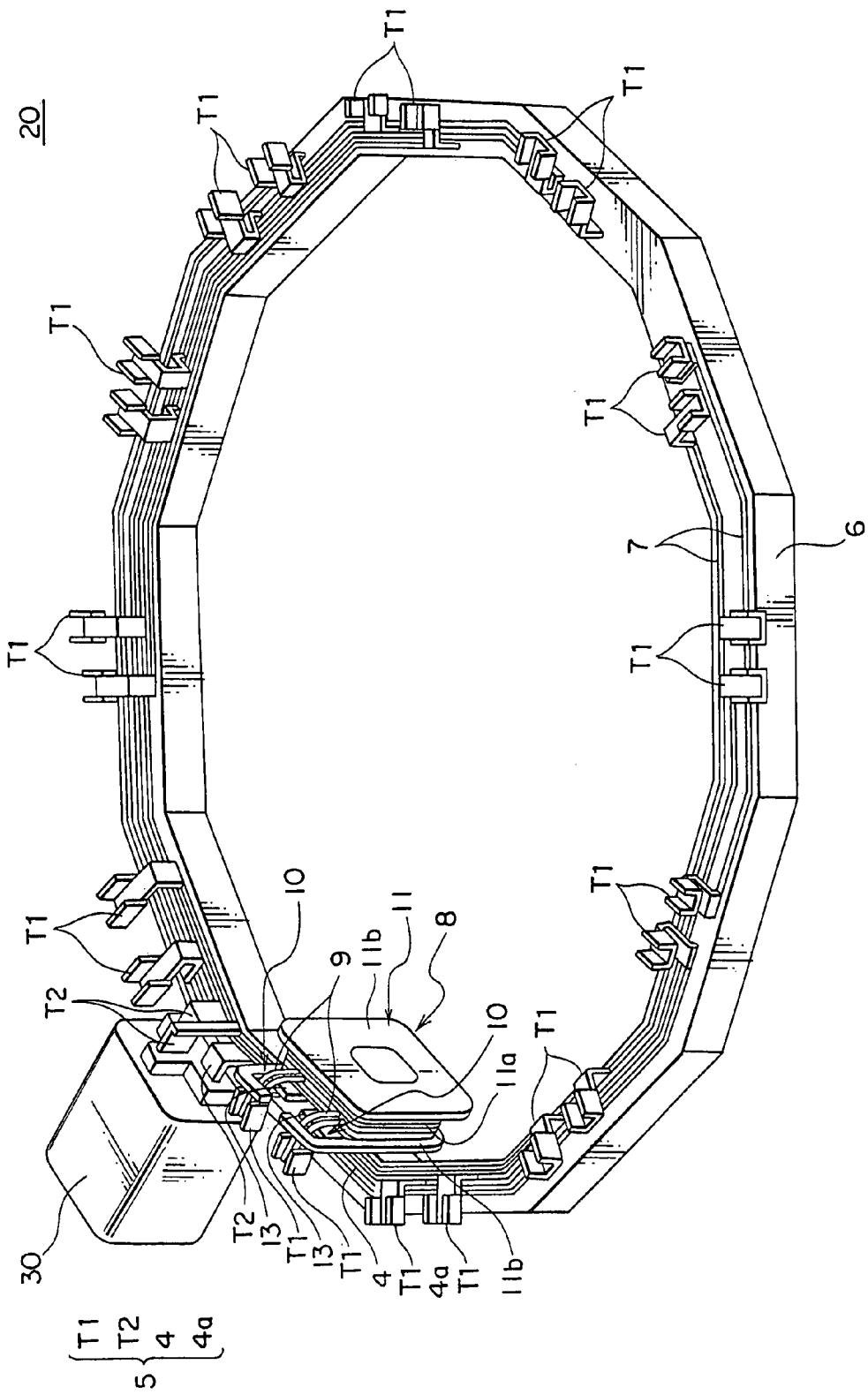
FIG. 1 is a perspective view showing a stator including a first embodiment of a connection terminal of the present invention.

An embodiment of a stator 20 of the present invention is a device included in a three-phase brushless motor. Referring to FIG. 1, the stator 20 includes a plurality of coil units 8 (only one coil unit is shown in FIG. 1 for illustration) disposed circularly and equally spaced about a rotation axle of a motor (not shown), a plurality of distributor units 5 for supplying electric currents to the coil units 8, and an insulated holder 6 for receiving the plurality of the distributor units 5. The holder 6 has an annular shape with respect to the rotation axle of the motor. The holder 6 has a plurality of receiving grooves 7 for receiving distributor elements 4 of the distributor units 5 and isolating the respective distributor elements 4. Reference number 30 in FIG. 1 denotes a connector housing connected with a power supply.

The coil unit 8 has electrical wires 9 formed with single copper wires coated with enamel and a bobbin 11 wound by the electrical wires 9, and is disposed on an inner edge of the holder 6. In the embodiment of the present invention, the coil unit 8 has two electrical wires 9 wound in the bobbin 11. The bobbin 11 is formed from an insulating synthetic resin with heat resistance and bending resistance. The bobbin 11 has a tube 11a for winding the electrical wires 9 and brims 11b disposed at both ends of the tube 11a and extending outwardly to hold the electrical wires 9. The electrical wires 9 of the present invention are a single core type.

The brim 11b close to the holder 6 has a cutout 10 for allowing wires ends of the electrical wires 9 wound on the tube 11a to pass therethrough. A part of an inner edge of the cutout 10 is flush with flat surfaces 2A of connection terminals T1. The wires ends are positioned on the flat surfaces 2A and the part of the inner edge is referred to a guide surface 13.

Figure 2:
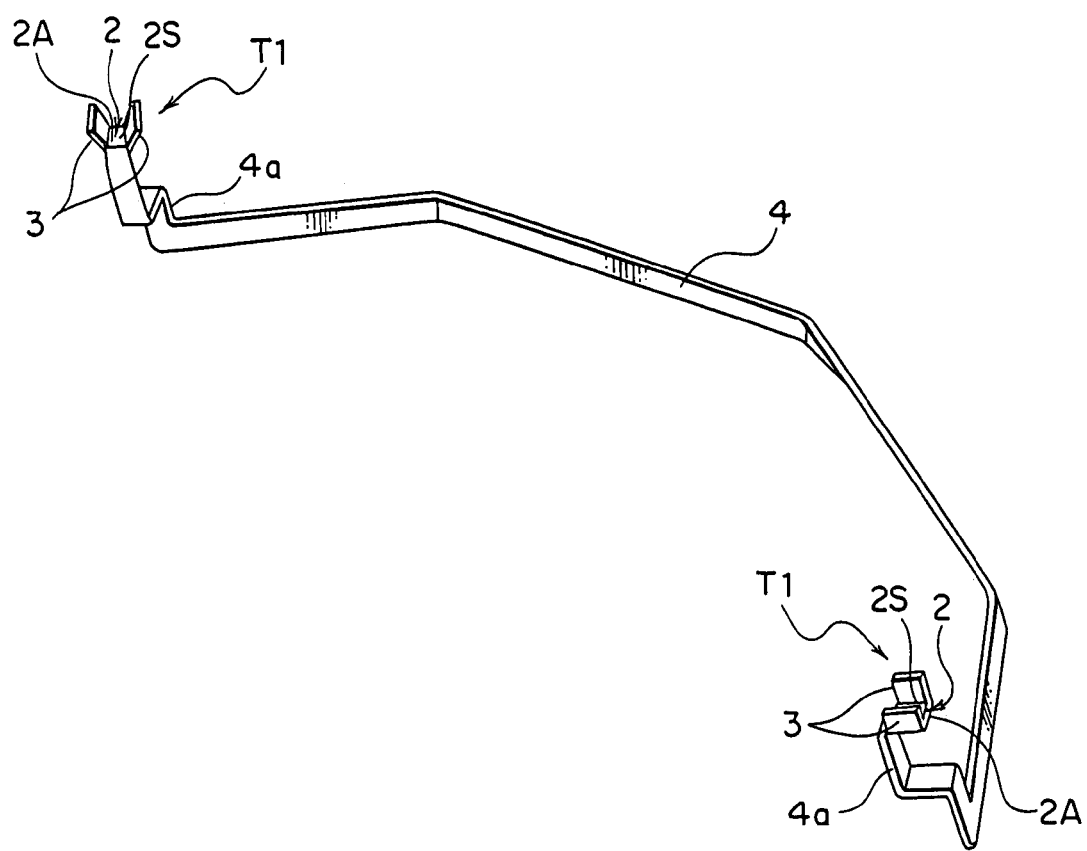
FIG. 2 is a perspective view showing a distributor unit of the stator of FIG. 1.

The distributor units 5 are formed by punching and bending a conductive metal plate. Referring to FIG. 1, the stator 20 has the distributor units 5 having two kinds of connection terminals T1 and T2. As shown in FIG. 2, each distributor unit 5 includes the distributor element 4, extensions 4a, and the connection terminals T1 (a first embodiment). The distributor units 5 has a belt shape and are disposed on the holder 6. The distributor elements 4 interconnect the coil units 8 and the connector housing 30. The extensions 4a extend orthogonally to a longitudinal direction of the distributor element 4. The connection terminals T1 are disposed on distal ends of the distributor unit 5 for connecting the wires ends of the electrical wires 9 of the coil unit 8. The connection terminals T2 (not shown in FIG. 2) are connected to the connector housing 30. The distributor units 5 are arranged in a prescribed pattern for supplying electrical power from the connector housing 30 to the coil units 8. The connection terminals T2 are only disposed on the distributor unit 5 which is directly connected with the connector housing 30.

The distributor elements 4 are received in the receiving grooves 7 and electrically isolated each other. The extensions 4a and the connection terminals T1, T2 extend outside from the receiving grooves 7. The wires ends of each coil unit 8 are connected to a pair of the connection terminals T1 aligned on the holder 6.

Figure 3:
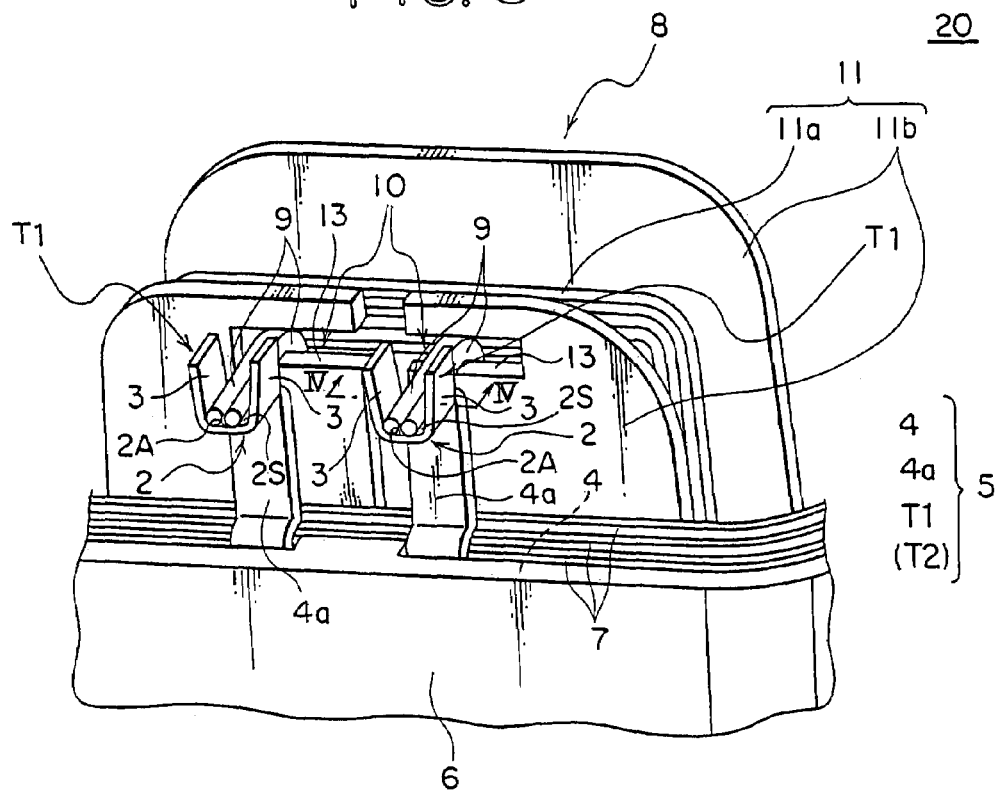
FIG. 3 is a perspective view of the connection terminal of FIG. 1 prior to crimping.
Figure 4:
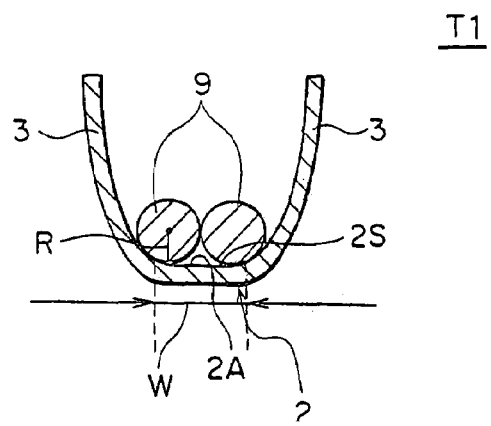
FIG. 4 is a sectional view of the connection terminal of FIG. 3 positioning electrical wires, taken along section IV-IV.

Referring to FIGS. 3 and 4, each connection terminal T1 is integral with the associated extension 4a, and includes a bottom wall 2 for holding the wires ends (two in the embodiment) and a pair of crimping pieces 3 upstanding from both edges in a width direction of the bottom wall 2. A setting surface 2S of the bottom wall 2 has a shape to stably hold the electrical wires 9. In the embodiment of the present invention, as shown in FIG. 4, the setting surface 2S has the flat surface 2A to hold the electrical wires 9. The flat surface 2A has a width W to satisfy a relation $W \geq (N-1)2R$, where N is the number of the electrical wires 9 and R is a radius of the wires 9. In the case of FIG. 4, the width W of the flat surface 2A becomes $W \geq 2R$. The width direction of the bottom wall 2 is perpendicular to the lengthwise direction of the electrical wires 9. The width direction of the flat surface 2A is same as that of the bottom wall 2.

Figure 5A:
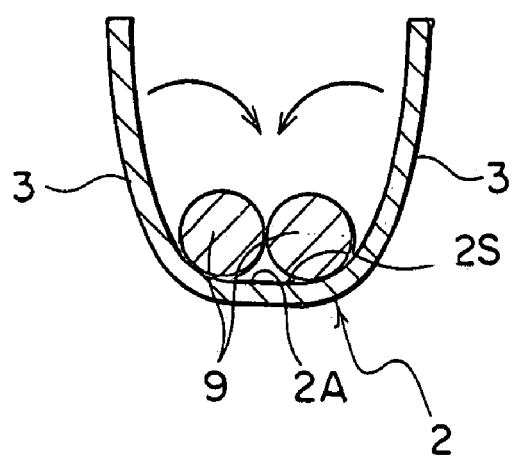
FIG. 5A is a sectional view of the connection terminal prior to crimping.
Figure 5B:
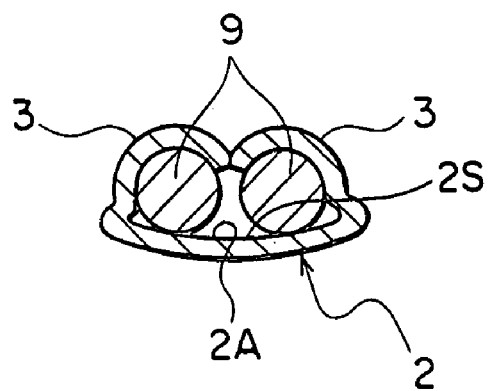
FIG. 5B is a sectional view of the connection terminal after crimped.
Figure 9A:
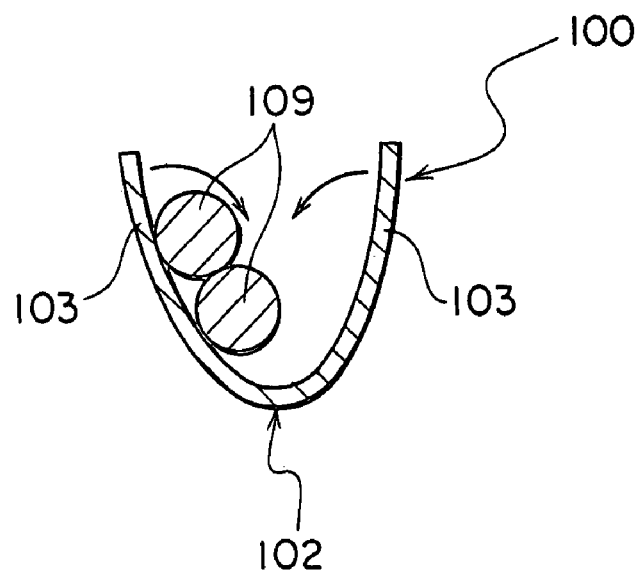
FIG. 9A is a sectional view of a conventional connection terminal prior to crimping.
Figure 9B:
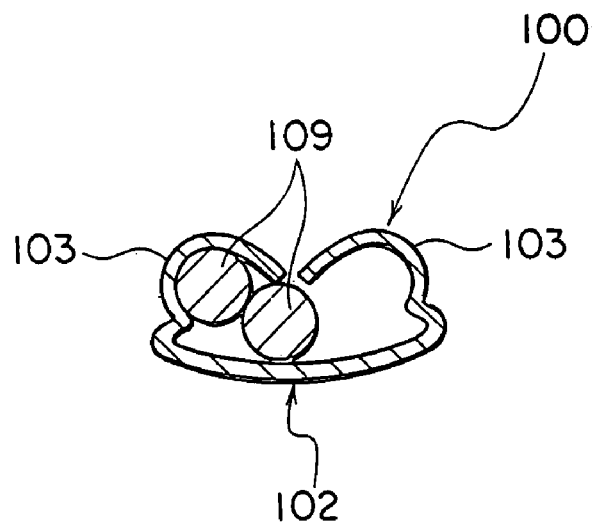
FIG. 9B is a sectional view of the conventional connection terminal after crimped.

Referring to FIG. 5A, the flat surface 2A correctly positions the electrical wires 9 in the connection terminal T1. An enamel coating of the wires ends is removed prior to attaching the wires ends to the connection terminal 1 or during crimping process. After the enamel coating is removed, end portions of the pair of the crimping pieces 3 are bent toward the bottom wall 2 to crimp the electrical wires 9 as shown in FIG. 5B. The flat surface 2A provides a uniform arrangement of the wires ends in the connection terminal T1 after crimping without displacement to one crimping piece 3 (see FIG. 9B).

The electric power is supplied to the electrical wires 9 of the coil units 8 through the connector housing 30 and the distributor units 5 for generating rotational magnetic fields in the stator 20 and rotating a rotor placed at the center.

The flat surface 2A of the setting surface 2S of the bottom wall 2 prior to crimping stably positions the electrical wires 9 so that the electrical wires 9 are crimped in the connection terminal Ti without displacement to the one-crimping piece 3.

The brims 11b of the respective bobbins 11 have the guide surfaces 13 flush with the flat surface 2A to stably position the electrical wires 9 on the flat surface 2A so that the electrical wires 9 are crimped in the connection terminal T1 without displacement to the one crimping piece 3.

Figure 6:
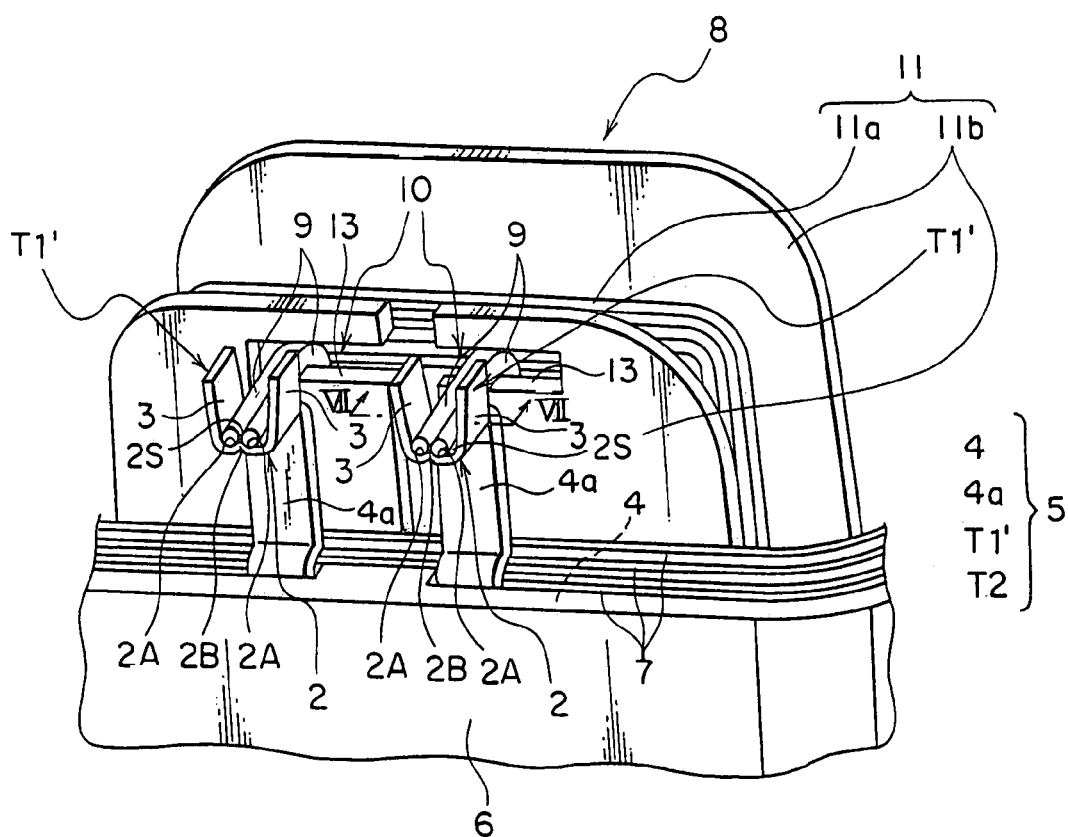
FIG. 6 is a perspective view showing a stator including a second embodiment of a connection terminal of the present invention.

FIG. 6 shows a stator having a second embodiment of a connection terminal of the present invention.

Figure 7:
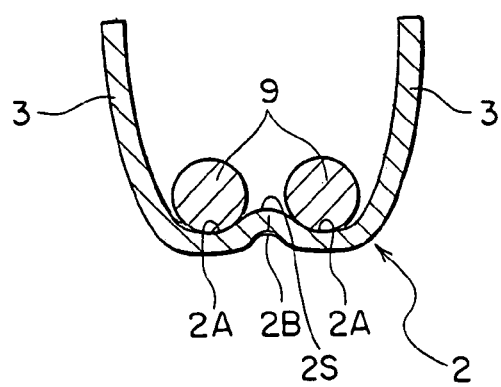
FIG. 7 is a sectional view of the connection terminal of FIG. 6, taken along section VII-VII.
Figure 8A:
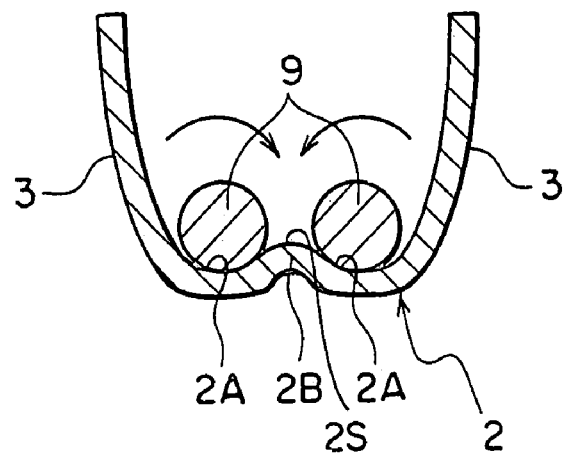
FIG. 8A is a sectional view of the connection terminal prior to crimping.
Figure 8B:
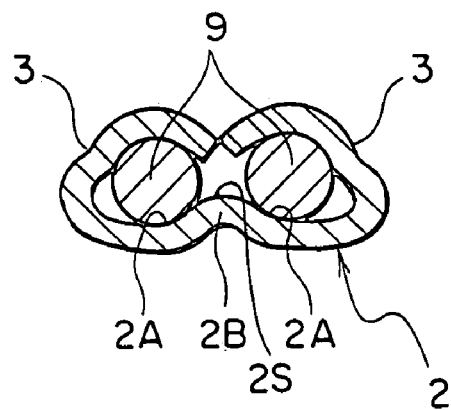
FIG. 8B is a sectional view of the connection terminal after crimped.

Referring to FIGS. 6 and 7, a connection terminal T1' has a flat surface 2A and a projection 2B, which extends upwardly from the flat surface 2A for positioning electrical wires 9 held on a setting surface 2S of a bottom wall 2. The projection 2B is formed by embossing the flat surface 2A of a metal plate and disposed at the center of a width direction of the setting surface 2S. Two electrical wires 9 positioned on the setting surface 2S are separated each other with the projection 2B as shown in FIG. 8A. The electrical wires 9 in the connection terminal T1' are positioned without displacement to one crimping piece 3. As shown in FIG. 8B, the electrical wires 9 are crimped with a pair of crimping pieces 3 without displacement to the one crimping piece 3. The crimped electrical wires 9 are separated each other with prescribed positions.

The first and second embodiments of the present invention disclose the respective connection terminals T1 and T1' crimping two electrical wires 9 but the connection terminals T1 and T1' can be adapted to two or more electrical wires 9. The connection terminals T1 and T1' are parts of the distributor units 5 of the stator 20 but not limited thereto. The connection terminals T1 and T1' can be utilized for terminals having male and female type connectors to be fitted with a mating terminal.

The first and second embodiments disclose the stators adapted to the three-phase brushless motor but not limited thereto. The stators 20 can be adapted to a distributor unit for the male and female type connectors. Each guide surface 13 is integral with the brim 11b of the bobbin 11 but not limited thereto. The guide surface 13 can be disposed on the holder 6 receiving the distributor unit 5 or disposed separately.

The embodiments of the present invention are only exemplary and not limited thereto. Any modification and alteration thereof are within the scope of the present invention.

What is claimed is:

1. A connection terminal comprising:
a bottom wall having a setting surface for stably holding a plurality of electrical wires prior to crimping; and
a pair of crimping pieces upstanding from both edges of the setting surface for crimping the plurality of the electrical wires,
wherein
the setting surface has a flat surface, extending between the pair of crimping pieces, satisfying a relation of $2R \cdot (N-1) \leq W < 2R \cdot N$, where W is a width of the flat surface, N is a number of the electrical wires, and R is a radius of the electrical wires; and
wherein the width of the flat surface is less than the width of the setting surface.

2. A stator comprising:
a coil unit circularly disposed around a rotation axle of a motor; and
a distributor unit for connecting the plurality of the electrical wires to supply electric current thereto of the coil unit, wherein
the distributor unit includes the connection terminal as claimed in claim 1, and
the coil unit has a bobbin having a guide surface flush with the flat surface of the connection terminal for positioning the electrical wires.

3. The stator as claimed in claim 2, wherein the guide surface is disposed on the bobbin of the coil unit wound with the electrical wires.

4. A connection terminal comprising:

a bottom wall for holding a plurality of electrical wires; and a pair of crimping pieces upstanding from both edges of the bottom wall for crimping the plurality of the electrical wires, wherein the bottom wall has a setting surface for stably holding the plurality of the electrical wires prior to crimping, and the setting surface has a flat surface between the pair of crimping pieces and a projection extending upwardly from the flat surface for positioning the electrical wires.

5. A stator comprising:

a coil unit circularly disposed around a rotation axle of a motor; and a distributor unit for connecting the plurality of the electrical wires to supply electric current thereto of the coil unit, wherein the distributor unit includes the connection terminal as claimed in claim 4, and the coil unit has a bobbin having a guide surface flush with the flat surface of the connection terminal for positioning the electrical wires.

6. The stator as claimed in claim 5, wherein the guide surface is disposed on the bobbin of the coil unit wound with the electrical wires.

\* \* \* \* \*